(12) United States Patent
Kim et al.

(10) Patent No.: US 8,760,396 B2
(45) Date of Patent: Jun. 24, 2014

(54) STEREOSCOPIC IMAGE DISPLAY DEVICE

(75) Inventors: Sung-Woo Kim, Gyeonggi-do (KR); Byung-Joo Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 313 days.

(21) Appl. No.: 13/155,855

(22) Filed: Jun. 8, 2011

(65) Prior Publication Data

US 2011/0304533 A1    Dec. 15, 2011

(30) Foreign Application Priority Data

Jun. 11, 2010  (KR) .................. 10-2010-0055651
May 2, 2011    (KR) .................. 10-2011-0041484

(51) Int. Cl.
*G09G 5/00* (2006.01)

(52) U.S. Cl.
USPC .............................. 345/156; 345/6

(58) Field of Classification Search
USPC ..................................... 345/156, 6
See application file for complete search history.

(56) References Cited

U.S. PATENT DOCUMENTS

| | | | |
|---|---|---|---|
| 4,870,600 A * | 9/1989 | Hiraoka ................. | 345/419 |
| 2006/0192746 A1* | 8/2006 | Ioki et al. .................. | 345/102 |
| 2007/0176914 A1 | 8/2007 | Bae et al. | |
| 2009/0015738 A1 | 1/2009 | Hong et al. | |
| 2009/0153653 A1 | 6/2009 | Lee et al. | |
| 2009/0153754 A1 | 6/2009 | Jung | |
| 2009/0190049 A1 | 7/2009 | Hone et al. | |
| 2010/0201790 A1 | 8/2010 | Son et al. | |
| 2011/0157498 A1* | 6/2011 | Kim et al. .................. | 349/15 |

FOREIGN PATENT DOCUMENTS

| | | |
|---|---|---|
| CN | 101344642 A | 1/2009 |
| CN | 101458412 A | 6/2009 |
| CN | 101458433 A | 6/2009 |
| CN | 101464578 A | 6/2009 |
| CN | 101799584 A | 8/2010 |

OTHER PUBLICATIONS

SIPO: Office Action and Search Report for Chinese Patent Application No. 2011-10153789.0—Issued on May 28, 2013—Including English Translation of all documents.

* cited by examiner

*Primary Examiner* — Aneeta Yodichkas
(74) *Attorney, Agent, or Firm* — Morgan, Lewis & Bockius LLP

(57) ABSTRACT

Disclosed is a stereoscopic image display device which detects movement of moving viewers from among multiple viewers and enables the multiple viewers to observe a stereoscopic image even if the moving viewers change positions, the stereoscopic image display device includes a display panel corresponding to one switchable region to emit two-dimensional images, the number of which is more than the number of N views (N being a natural number over 3), a switchable panel located on the display panel to convert the two-dimensional images into three-dimensional images and to emit the three-dimensional images when voltage is applied thereto, a detection unit to detect movement of moving viewers from among multiple views and final positions of the moving viewers, and a control unit to output a control signal to shift the views of the two-dimensional images according to the movement and the final positions of the moving viewers.

10 Claims, 10 Drawing Sheets

STEREOSCOPIC IMAGE DISPLAY DEVICE

This application claims the benefit of Korean patent application No. 10-2010-0055651, filed on Jun. 11, 2010 and No. 10-2011-0041484, filed on May 2, 2011, which are hereby incorporated by references as if fully set forth herein.

BACKGROUND OF THE INVENTION

1. Field of the Invention

The present invention relates to a stereoscopic image display device, and more particularly, to a stereoscopic image display device which enables multiple viewers to observe a stereoscopic image without use of glasses, and particularly to observe the stereoscopic image through detection of movement of the viewers even when the viewers change positions.

2. Discussion of the Related Art

These days, it is expected that services to achieve high speed data transmission to be established based on high speed data communication networks are developed from a simply listening and speaking service, such as a current phone, toward a watching and listening service, i.e., a multimedia service through a digital terminal processing character, voice, and image data at high speed, and is expected to be eventually developed toward a hyperspace-type real three-dimensional data communication service, i.e., a realistically and three-dimensionally watching, feeling, and enjoying service beyond time and space.

In general, three-dimensional stereoscopic imagery is achieved based upon the principle of stereo vision through two eyes. Since there is an interval of approximately 65 mm, between two eyes, the left eye and the right eye perceive slightly different images due to the positional difference between the two eyes. Such an image difference due to the positional difference therebetween is referred to as binocular disparity.

A three-dimensional stereoscopic image display device enables the left eye to observe only an image corresponding to the left eye and the right eye to observe only an image corresponding to the right eye using the binocular disparity, thus enabling a viewer to feel three-dimensional effect. That is, the left/right eyes respectively observe different two-dimensional images, and when the two images are transferred to a brain through retinas, the brain correctly combines the two images and reproduces depth perception and realism of an original three-dimensional image. Such ability is usually referred to as stereography (stereoscopy), and a display device to which stereography is applied is referred to as a stereoscopic image display device.

Stereoscopic image display devices are divided into a glasses type and an autostereoscopic type according to whether or not glasses are required. Further, autostereoscopic type display devices are divided into a lenticular type and a switchable panel type according to shapes of structures implementing three-dimensional images.

A lenticular type stereoscopic image display device includes a semi-cylindrical lenticular sheet attached to a display panel and thus implements a stereoscopic image. A switchable panel type stereoscopic image display device includes a switchable panel provided on a display panel emitting two-dimensional images to convert the two-dimensional images into a three-dimensional image and thus implements a stereoscopic image. Switchable panel type stereoscopic image display devices are divided into a switchable barrier type and a switchable liquid crystal lens type.

FIG. 1 is a view illustrating a general switchable barrier type stereoscopic image display device.

As shown in FIG. 1, a barrier 10 and a slit 15 are alternately arranged in front of a display panel 5 having right eye image information R and left eye image information L corresponding to a right eye RE and a left eye LE of a viewer, and thus the right eye image information R is input to the right eye RE of the viewer and the left eye image information L is input to the left eye LE of the viewer through the slit 15. As described above, a region in which the right eye image information R is input to the right eye RE of the viewer and the left eye image information L is input to the left eye LE of the viewer is referred to as an ortho-stereoscopic region.

In case of the above general switchable barrier type stereoscopic image display device having two views (disparity), even if a viewer moves slightly, the viewer moves to an inverse-stereoscopic region in which the left eye image information L is input to the right eye RE of the viewer and the right eye image information R is input to the left eye LE of the viewer, and thus cannot observe the stereoscopic image.

SUMMARY OF THE INVENTION

Accordingly, the present invention is directed to a stereoscopic image display device.

An object of the present invention is to provide a stereoscopic image display device which enables multiple viewers to observe a stereoscopic image, particularly to observe the stereoscopic image through detection of movement of the viewers using user tracking technology even when the viewers change positions.

To achieve this object and other advantages and in accordance with the purpose of the invention, as embodied and broadly described herein, a stereoscopic image display device includes a display panel corresponding to one switchable region to emit two-dimensional images, the number of which is more than the number of N views (disparity) (N being a natural number), a switchable panel located on the display panel to convert the two-dimensional images into three-dimensional images and to emit the three-dimensional images when voltage is applied thereto, a detection unit to detect movement of moving viewers from among multiple views and final positions of the moving viewers, and a control unit to output a control signal to shift the views of the two-dimensional images according to the movement and the final positions of the moving viewers.

The switchable panel may include first and second substrates disposed opposite to each other, a plurality of first electrodes formed on the first substrate corresponding to the one switchable region, a second electrode formed on the second substrate, and a voltage source to apply voltages to the plurality of first electrodes and the second electrode.

Parabolic potential surfaces may be formed in a liquid crystal layer of the switchable panel by applying the voltages to the first and second electrodes.

A liquid crystal layer of the switchable panel may be divided into black regions and white regions by applying the voltages to the first and second electrodes.

The switchable panel further may include a polarizing plate formed on the second substrate.

The voltage source may apply voltages, which are increased from the center of the one switchable region to both sides thereof, to the plurality of first electrodes corresponding to the one switchable region.

The control unit may output a voltage control signal to shift the voltages applied to the plurality of first electrodes according to the movement and the final positions of the moving viewers.

The voltage control signal may shift the views of the two-dimensional images so that continuous views correspond to both eyes of the viewers which have moved.

The detection unit may detect the movement of the moving viewers through a difference between the pupils or a part of the faces of the moving viewers and a background color.

If an interval between the views is an interval between both eyes of the viewers/m, (N−1)/M viewers may simultaneously observe a stereoscopic image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In a switchable barrier type stereoscopic image display device generally having two views (disparity), requirement of multi-views of more than three views is needed so that a viewer may observe a stereoscopic image even if the viewer moves to an inverse-stereoscopic region in which the viewer cannot observe the stereoscopic image.

Here, views are units of the stereoscopic image, and in order to actually feel three-dimensional effect, one eye needs to be located in each view. For example, observing of an ortho-stereoscopic image or an inverse-stereoscopic image according to movement of a viewer, if four views are implemented, will be described as follows.

Figure 1:
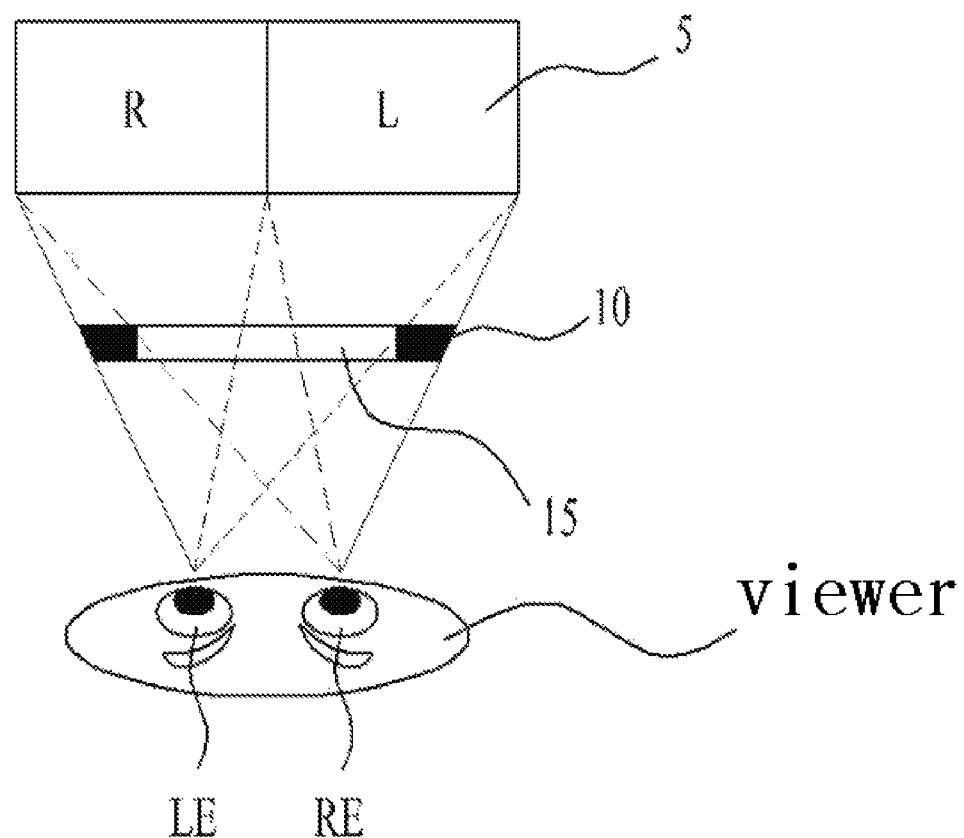
FIG. 1 is a view illustrating a general switchable barrier type stereoscopic image display device.
Figure 2:
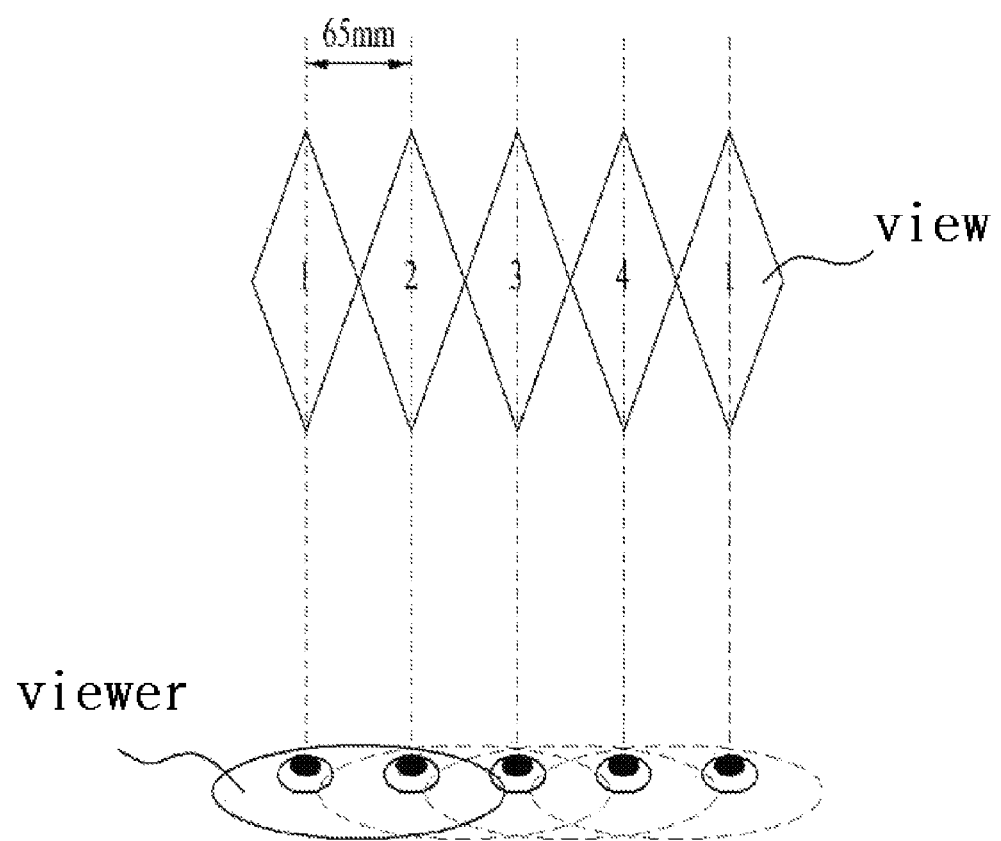
FIG. 2 is a view illustrating four views (disparity) of a stereoscopic image display device.

FIG. 2 is a view illustrating four views of a stereoscopic image display device.

As shown in FIG. 2, views are located in order of view 1, view 2, view 3, view 4, view 1, . . . , and a viewer to observe the stereoscopic image display device having the four views may observe a stereoscopic image in ortho-stereoscopic regions between continuous views 1 and 2, between continuous views 2 and 3, and between continuous views 3 and 4, but cannot observe the stereoscopic image in an inverse-stereoscopic region between discontinuous views 4 and 1.

Therefore, movement of the pupils or the face of the viewer may be sensed and then the inverse-stereoscopic region in which the viewer is located may be converted into an ortho-stereoscopic region so that the viewer located in the inverse-stereoscopic region may observe the stereoscopic image. However, this describes a method of sensing movement of one viewer, and such a method is not applied to a display, such as a TV, observed by multiple viewers.

Hereinafter, with reference to the accompanying drawings, a stereoscopic image display device in accordance with the present invention will be described in detail.

Figure 3:
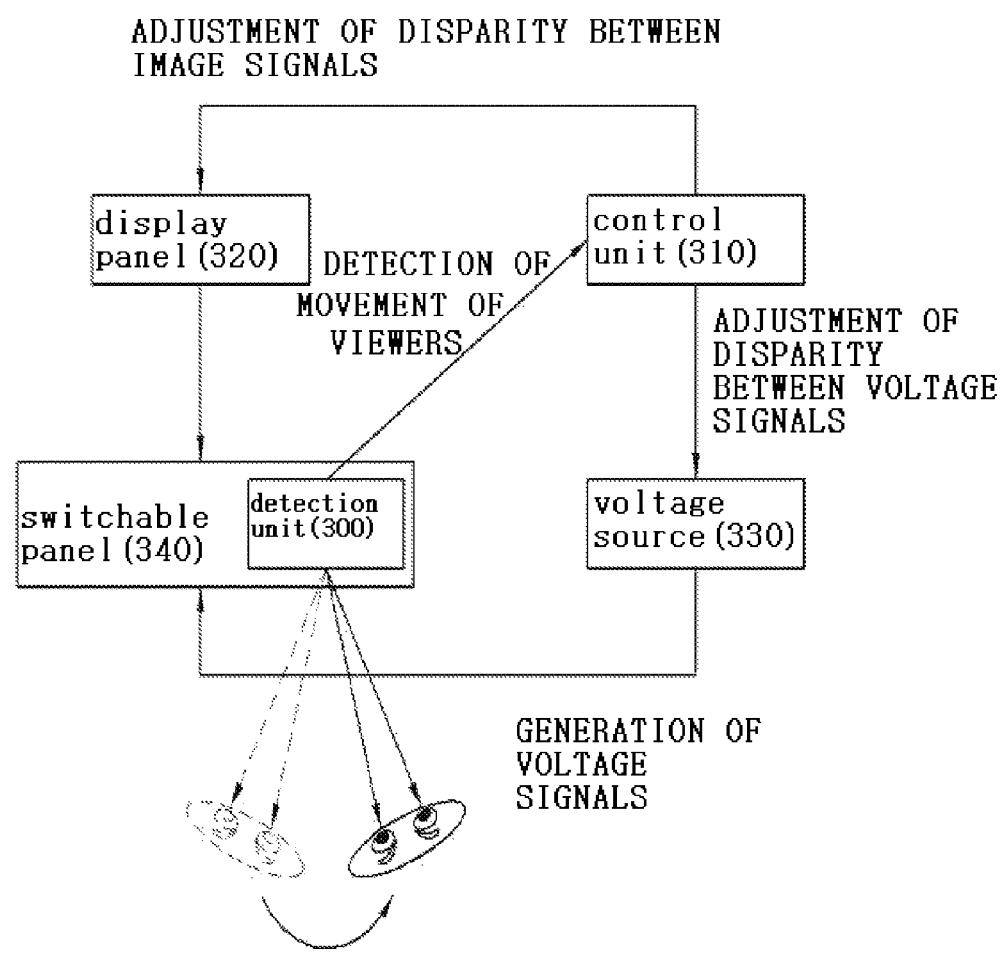
FIG. 3 is a block diagram of a stereoscopic image display device in accordance with the present invention.

FIG. 3 is a block diagram of a stereoscopic image display device in accordance with the present invention.

As shown in FIG. 3, the stereoscopic image display device of the present invention includes a display panel 320 corresponding to one switchable region to emit two-dimensional images, the number of which is more than the number of N views (disparity) (N being a natural number), a switchable panel 340 located on the display panel 320 to convert the two-dimensional images into three-dimensional images and to emit the three-dimensional images when voltage is applied thereto, a detection unit 300 to detect movement of moving viewers from among multiple viewers and final positions of the moving viewers, and a control unit 310 to output a control signal to shift the views of the two-dimensional images according to the movement and the final positions of the moving viewers.

In the stereoscopic image display device enabling multiple viewers to observe a stereoscopic image, a viewer from among the multiple viewers, who is located in an inverse-stereoscopic region and thus cannot observe a stereoscopic image, may change position in order to observe the stereoscopic image. Further, there may be a viewer who is located in an ortho-stereoscopic region and randomly changes position to an inverse-stereoscopic region.

Therefore, in the stereoscopic image display device of the present invention, liquid crystals of the switchable panel 340 may be re-arranged so that viewers located in the inverse-stereoscopic regions change positions to ortho-stereoscopic regions so as to observe the stereoscopic image.

First, the detection unit 300 is preferably any one of various detectors, such as a camera or an infrared sensor to recognize colors and positions, so as to recognize movement of viewers, the positions of which are changed, and regions in which the viewers are finally located. For example, if the detection unit 300 is a camera, the camera is installed on the display panel 320 or the switchable panel 340 and detects final positions of moving viewers through recognition of the pupils or heads of the viewers or various other methods.

If the camera senses movement of the pupils of a viewer, when the viewer changes position, the camera detects a central position between the pupils of right and left eyes of the viewer and recognizes change of the central position. Further, if the camera senses movement of the head of a viewer, when the viewer turns his/her head or moves, the camera recognizes movement of the viewer through a difference between the head and a background color and thus detects the final position of the viewer.

Thereafter, the control unit 310 outputs a control signal to adjust disparity between image signals and between voltage signals so that continuous views correspond to both eyes of the viewer at the final position, when the detection unit 300 detects movement of the viewer.

First, the control unit 310 outputs a voltage control signal to adjust the voltage signals applied to a voltage source 330 to apply voltage to liquid crystals of the switchable panel 340, thus shifting views of two-dimensional images emitted from the display panel 320.

The voltage source 330 serves to apply voltage to first and second electrodes (not shown) of the switchable panel 340. If the switchable panel 340 is of a switchable liquid crystal lens type, the liquid crystals of the switchable panel 340 are arranged according to the voltage signals applied from the voltage source 330 to the first and second electrodes (not shown) of the switchable panel 340, and light path differences between the liquid crystals occurs, thus allowing a liquid crystal layer to have a lens effect.

When the voltage signals are adjusted in such a manner, the liquid crystal lens of the switchable panel 340 is moved by shifting the voltage applied to the first electrode (not shown) so that the final position of the viewer is located in the ortho-stereoscopic region, thereby enabling the viewer to observe the stereoscopic image. Here, the liquid crystal lens is not actually moved but it looks as if the lens is moved due to a refractive index difference between the liquid crystals.

If the switchable panel 340 is of a switchable barrier type, a polarizing plate is further provided on the switchable panel 340. The liquid crystals of the switchable panel 340 are arranged according to the voltage signals applied from the voltage source 330 to the first and second electrodes (not shown) of the switchable panel 340, and thus a plurality of black regions and a plurality of white regions are reversed, thus enabling the viewer, the position of which has been changed, to observe the stereoscopic image.

The display panel 320 is a flat display device displaying two-dimensional images, such as a liquid crystal display device, an organic light emitting display device, a plasma display panel, or a field emission display device.

The control unit 310 adjusts disparity between image signals so that the display panel 320 reproduces an image, thereby enabling the viewer to observe the stereoscopic image although the viewer changes position.

Figure 4:
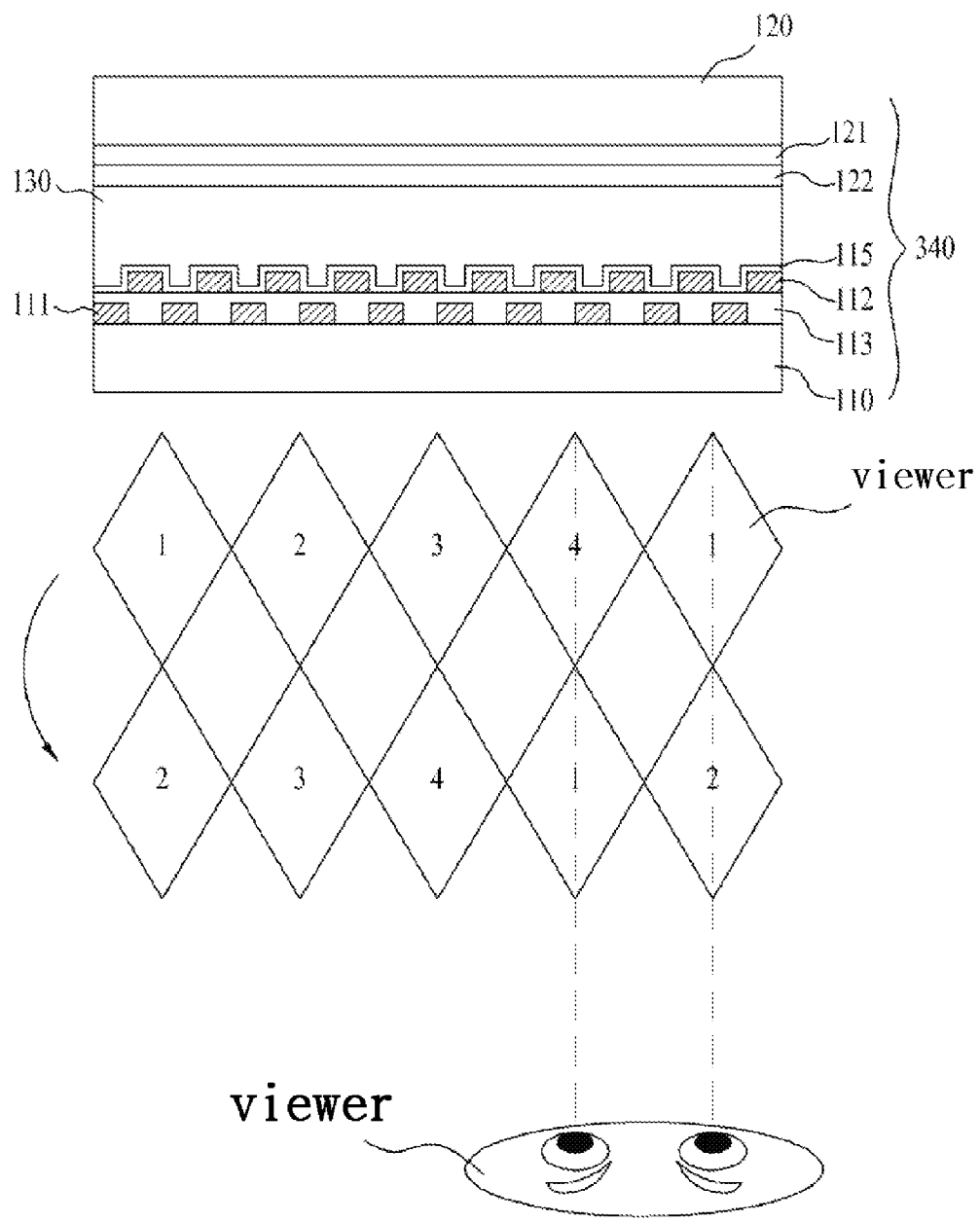
FIG. 4 is a cross-sectional view of a switchable panel of FIG. 3.

FIG. 4 is a cross-sectional view of the switchable panel 340 of FIG. 3.

With reference to FIG. 4, the switchable panel 340 includes first and second substrates 110 and 120 disposed opposite to each other, a plurality of first electrodes 111 and 112 separated from each other by the same interval with respect to one switchable region on the first substrate 110, a second electrode 121 formed over the entire lower surface of the second substrate 120, a voltage source (not shown) to apply different voltages to the first electrodes 111 and 112, and a liquid crystal layer 130 filling a gap between the first substrate 110 and the second substrate 120. Further, first and second alignment films 115 and 122 may be further provided.

In the above-described stereoscopic image display device, different voltages are applied to the plurality of first electrodes 111 and 112, and thus the liquid crystal layer 130 is driven by different electric fields according to position.

If the switchable panel 340 is of the switchable liquid crystal lens type, voltages, which are increased from the center of one switchable region to both sides thereof, are applied to the plurality of first electrodes 111 and 112. Further, the liquid crystals are arranged according to the voltage signals and thus light path differences between the liquid crystals occur, thereby allowing the liquid crystal layer 130 to have a lens effect so that viewers may observe a stereoscopic image.

On the other hand, if the switchable panel 340 is of the switchable barrier type, the liquid crystals are arranged according to the voltage signals applied to the plurality of first electrodes 111 and 112 and thus the liquid crystal layers 130 is divided into black regions and white regions, thereby enabling viewers to observe a stereoscopic image through the white regions. In this case, a polarizing plate may be further provided on the second substrate 120.

In the above-described stereoscopic image display device, if a viewer is located in an inverse-stereoscopic region, the viewer cannot observe a stereoscopic image. For example, since view 4 and view 1 are discontinuous, and thus a region in which view 4 and view 1 are located is an inverse-stereoscopic region causing a viewer not to observe a stereoscopic image.

Therefore, when a viewer located in the inverse-stereoscopic region moves to another position in order to observe a stereoscopic region, the detection unit 300 recognizes the pupils or head of the moving viewer and changes voltages applied to the plurality of first electrodes 111 and 112 so that the region in which the viewer is located becomes an ortho-stereoscopic region, thereby converting the discontinuous views 4 and 1 into continuous views 1 and 2.

Figure 5:
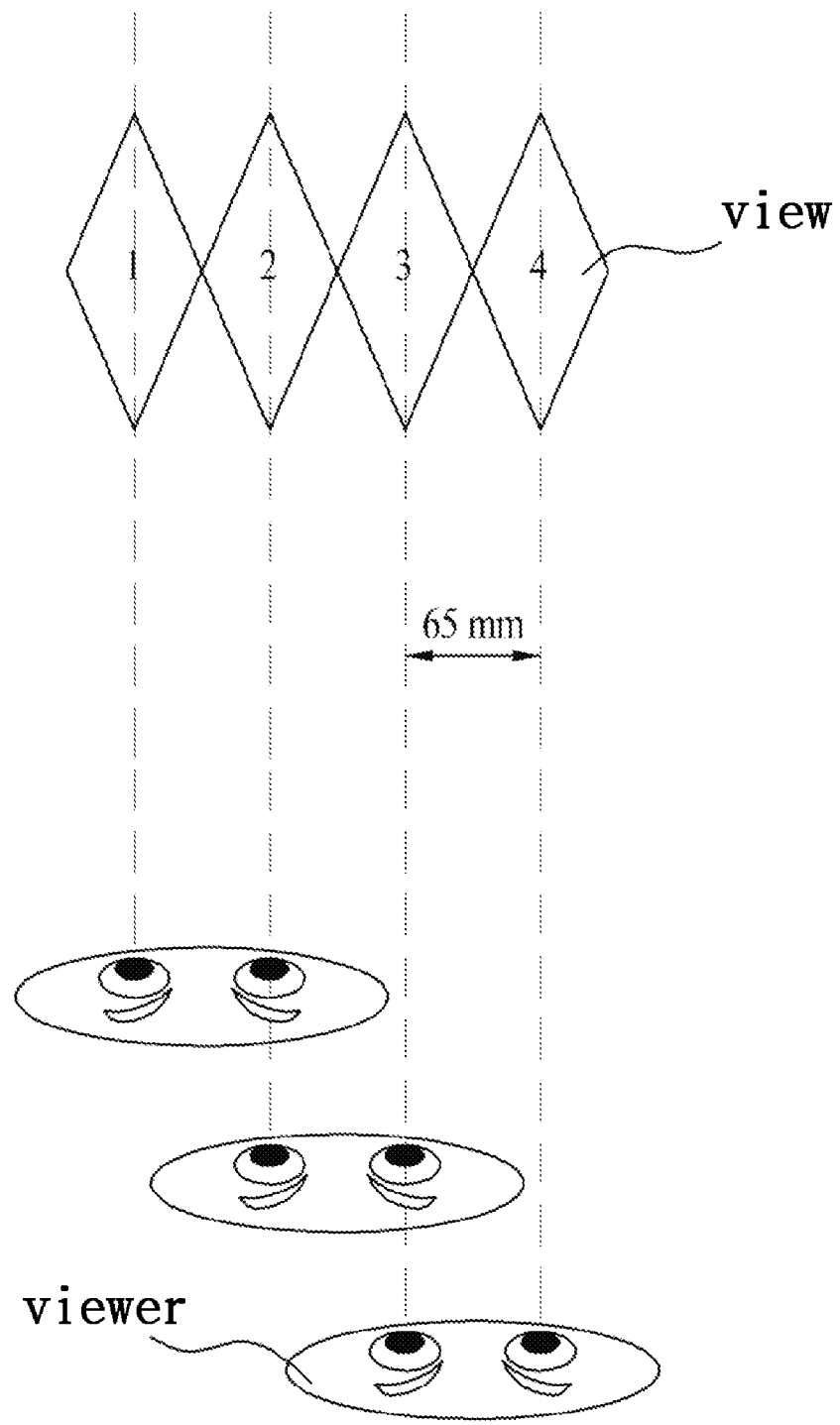
FIG. 5 is a view illustrating a stereoscopic image display device in accordance with a first embodiment of the present invention.

FIG. 5 is a view illustrating a stereoscopic image display device in accordance with a first embodiment of the present invention.

In the stereoscopic image display device in accordance with the first embodiment, as shown in FIG. 5, four continuous views are arranged in order of view 1, view 2, view 3, view 4, view 1, . . . . Further, an interval between the views is 65 mm similar to an interval between both eyes of a human, and one view corresponds to a gap between both eyes of a viewer.

With reference to FIG. 5, three viewers are respectively located in ortho-stereoscopic regions between continuous views 1 and 2, between continuous view 2 and 3, and between continuous views 3 and 4, and, if distances between the display panel 320 (in FIG. 3) and the viewers are regular, the viewers may observe a stereoscopic image.

Figure 6A:
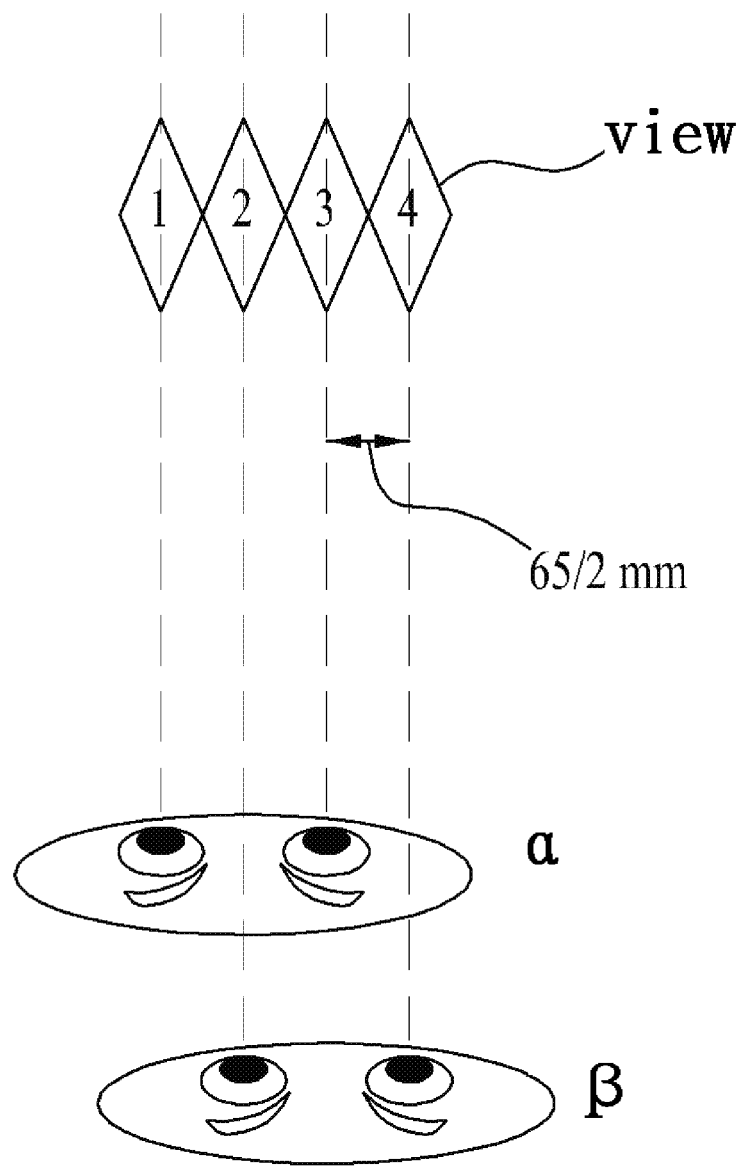
FIGS. 6A and 6B are views illustrating a stereoscopic image display device in accordance with a second embodiment of the present invention.
Figure 6B:
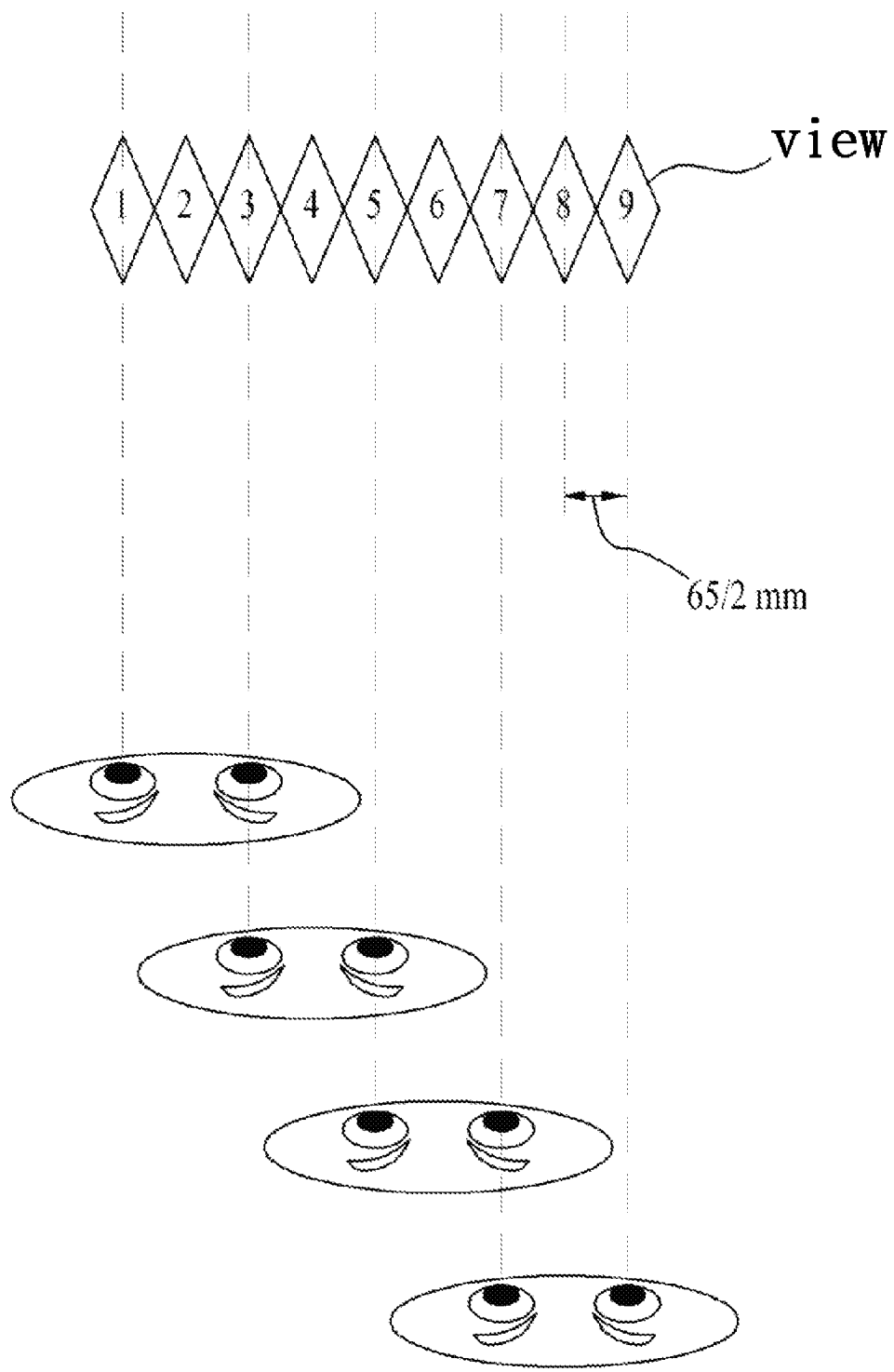

FIGS. 6A and 6B are views illustrating a stereoscopic image display device in accordance with a second embodiment of the present invention. FIG. 6A illustrates the stereoscopic image display device as having four continuous views, and FIG. 6B illustrates the stereoscopic image display device as having nine continuous views. Further, as shown in FIGS. 6A and 6B, the number of views disposed between both eyes of a viewer is two, and an interval between the views is 65 mm/2.

With reference to FIG. 6A, when two viewers α, β are respectively located in ortho-stereoscopic regions between continuous views 1 and 3 and between continuous views 2 and 4. The viewers α, β can observe stereoscopic images. In this case, the two viewers can observe stereoscopic images when they fix on the ortho-stereoscopic regions between views 1 and 3 and between continuous views 2 and 4, respectively. However, if one of two viewer α, β moves, there is no condition to satisfy that the two viewers α, β are together located in ortho-stereoscopic regions. In example, when the viewer α observing the views 1 and 3 does not move and the viewer β observing the views 2 and 4 moves, there is no view condition satisfying both viewers located in ortho-stereoscopic regions since tracking is carried out according to movement of the moving viewer β. If the moving viewer β moves to correspond to views 3 and 1, tracking is carried out and then switching views is carried out from views 3 and 1 to views 1 and 3. After tracking and switching, the fixed viewer α observes views 4 and 2. In this case, the fixed viewer α is located in inverse-stereoscopic region, therefore, the fixed viewer α cannot observe stereoscopic image. Therefore, if the stereoscopic image display device has four continuous views and the interval between the views is 65 mm/2, only one viewer located in the ortho-stereoscopic region between the views 1 and 3 or between the views 2 and 4 may observe the stereoscopic image with tracking.

In the same manner, if the stereoscopic image display device has nine continuous views and the interval between the views is 65 mm/2, as shown in FIG. 6B, only four viewers located in the ortho-stereoscopic regions between the views 1 and 3, between the views 3 and 5, between the views 5 and 7, and between the views 7 and 9 may observe the stereoscopic image.

That is, with reference to the first and second embodiments, if the number of views in one switchable region is N (N being a natural number more than 3) and an interval between the views is 65 mm/M (M being the number of views disposed between both eyes of a viewer and being a natural number more than 1), (N−1)/M viewers may simultaneously observe a stereoscopic image.

For example, if the number of views in one switchable region is four and an interval between the views is 65 mm as in the first embodiment, the number of views disposed between both eyes of a viewer, i.e., M is one and thus three viewers may simultaneously observe a stereoscopic image. Further, if the number of views in one switchable region is four and an interval between the views is 65 mm/2 as in the second embodiment, one viewer may observe a stereoscopic image.

Hereinafter, a method of displaying an ortho-stereoscopic image, if one viewer from among viewers located in ortho-stereoscopic regions moves to an inverse-stereoscopic region, by detecting movement of the moving viewer will be described.

Figure 7:
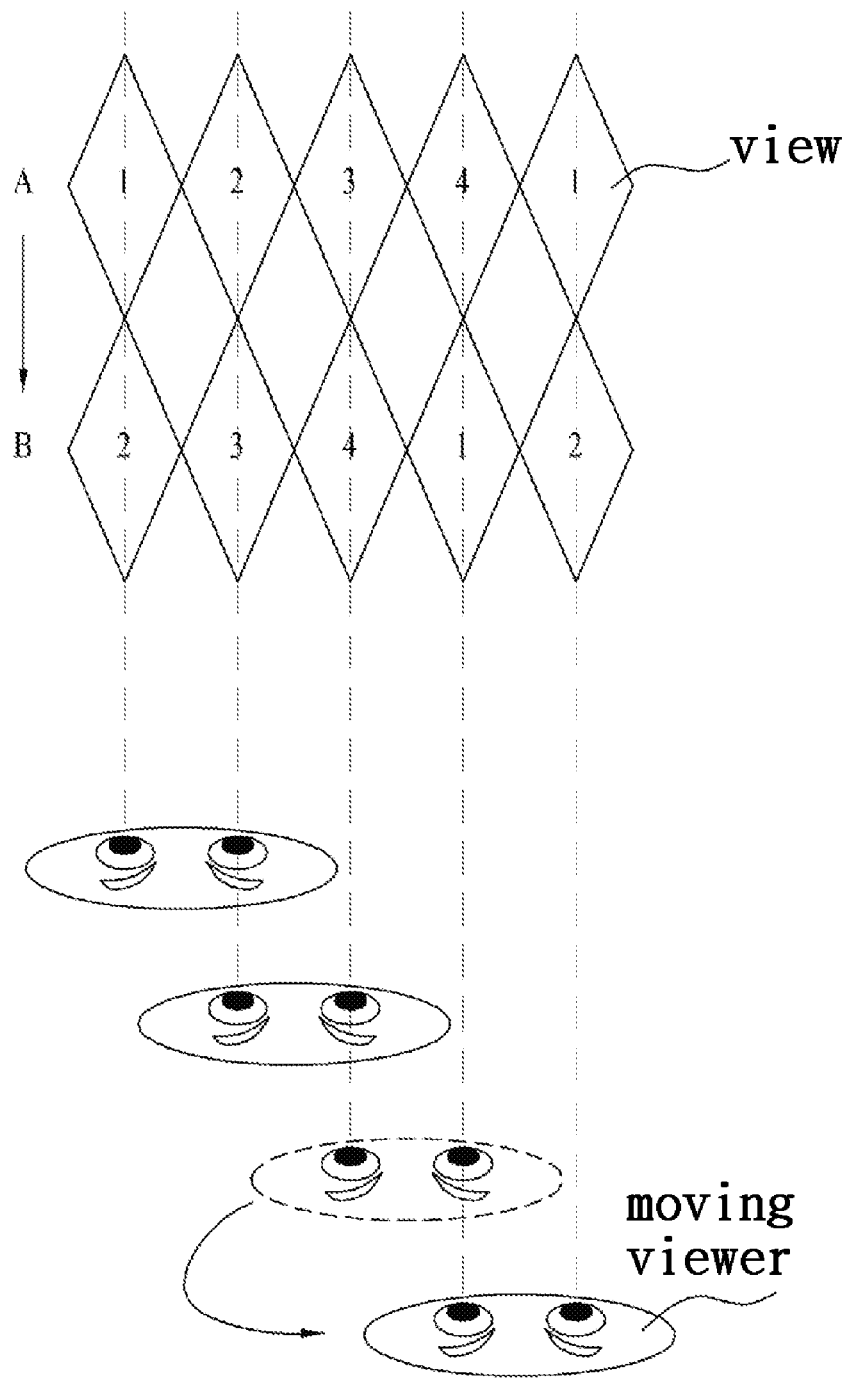
FIG. 7 is a view illustrating a stereoscopic image display device in accordance with a third embodiment of the present invention.

FIG. 7 is a view illustrating a stereoscopic image display device in accordance with a third embodiment of the present invention.

As shown in FIG. 7, when a viewer located in an ortho-stereoscopic region between continuous views 3 and 4 of an image A moves to an inverse-stereoscopic region between discontinuous views 4 and 1 of the image A, the viewer cannot observe an stereoscopic image. Therefore, in order to convert the inverse-stereoscopic region between the discontinuous views 4 and 1 into an ortho-stereoscopic region, the image A is converted into an image B by adjusting disparity between voltage signals applied to the plurality of first electrodes 111 and 112 (in FIG. 4). Then, the viewer is located in an ortho-stereoscopic region between continuous views 1 and 2 and thus may observe the stereoscopic image.

Figure 8:
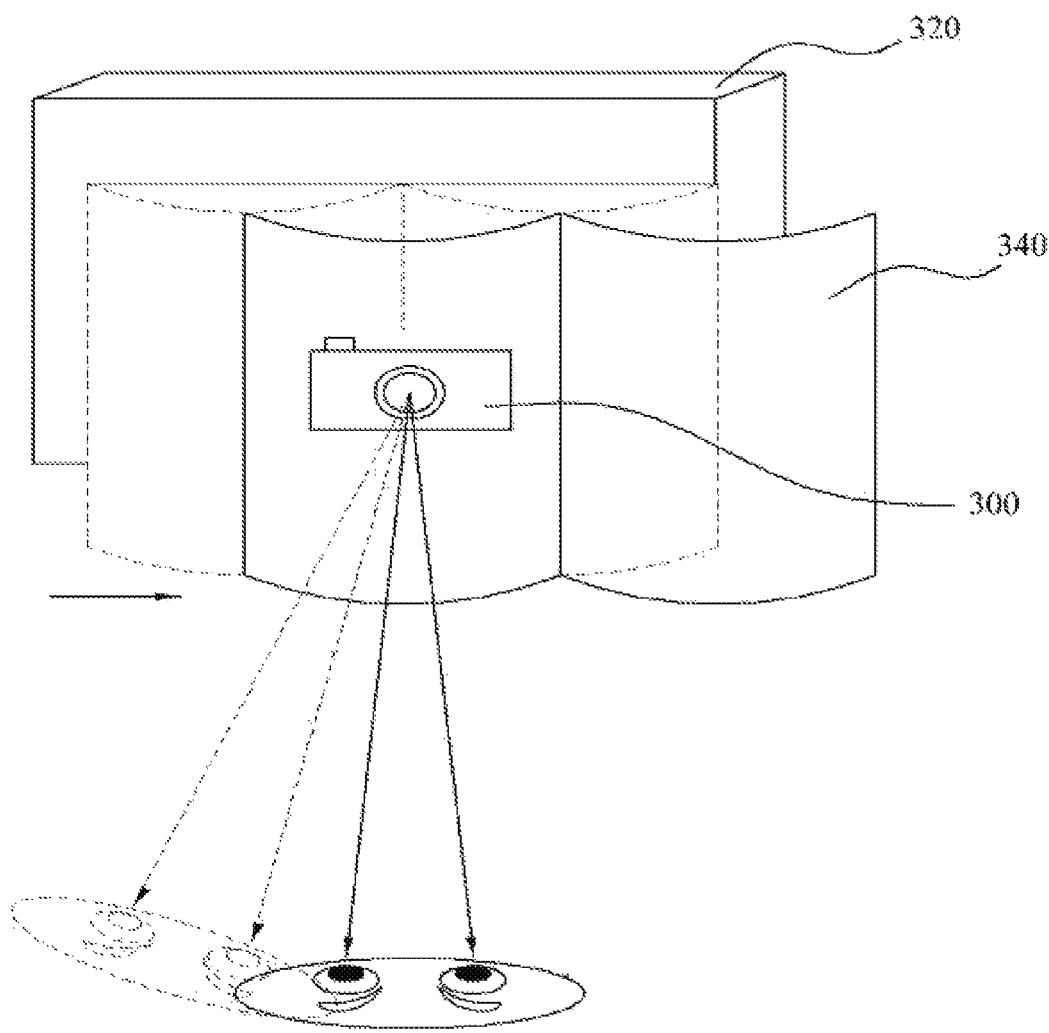
FIG. 8 is a view illustrating a user tracking method of a stereoscopic image display device in accordance with the present invention.

FIG. 8 is a view illustrating a user tracking method of a stereoscopic image display device in accordance with the present invention. Here, the stereoscopic image display device is of a switchable liquid crystal lens type.

For example, movement of a viewer may mainly occur in a region in which inverse-stereoscopy is generated, because, when both eyes of the viewer correspond to inverse-stereoscopy, the viewer cannot observe a stereoscopic image and thus tries to move. In consideration of this fact, the stereoscopic image display device may sense movement of the viewer and display an image corresponding to ortho-stereoscopy based on a region to which the viewer has moved.

The switchable liquid crystal lens type stereoscopic image display device includes the switchable panel 340 in front of the display panel 320 (in FIG. 3) having right eye image information R and left eye image information L corresponding to a right eye RE and a left eye LE of a viewer, and FIG. 8 illustrates only a switchable liquid crystal lens of the switchable panel 340.

When the viewer changes position, the detection unit 300 (in FIG. 3) detects the final position of the moving viewer. The detection unit 300 (in FIG. 3) may recognize color, and track movement of the head of the viewer or discriminately recognize the pupil and the sclera of the viewer.

Thereby, by adjusting disparity between voltage signals applied to liquid crystals of the switchable liquid crystal lens, it looks as if the switchable liquid crystal lens is moved from the initial position to a changed position, and thus the final position of the viewer becomes an ortho-stereoscopic region. Thereby, the viewer at the final position may observe the stereoscopic image.

Figure 9:
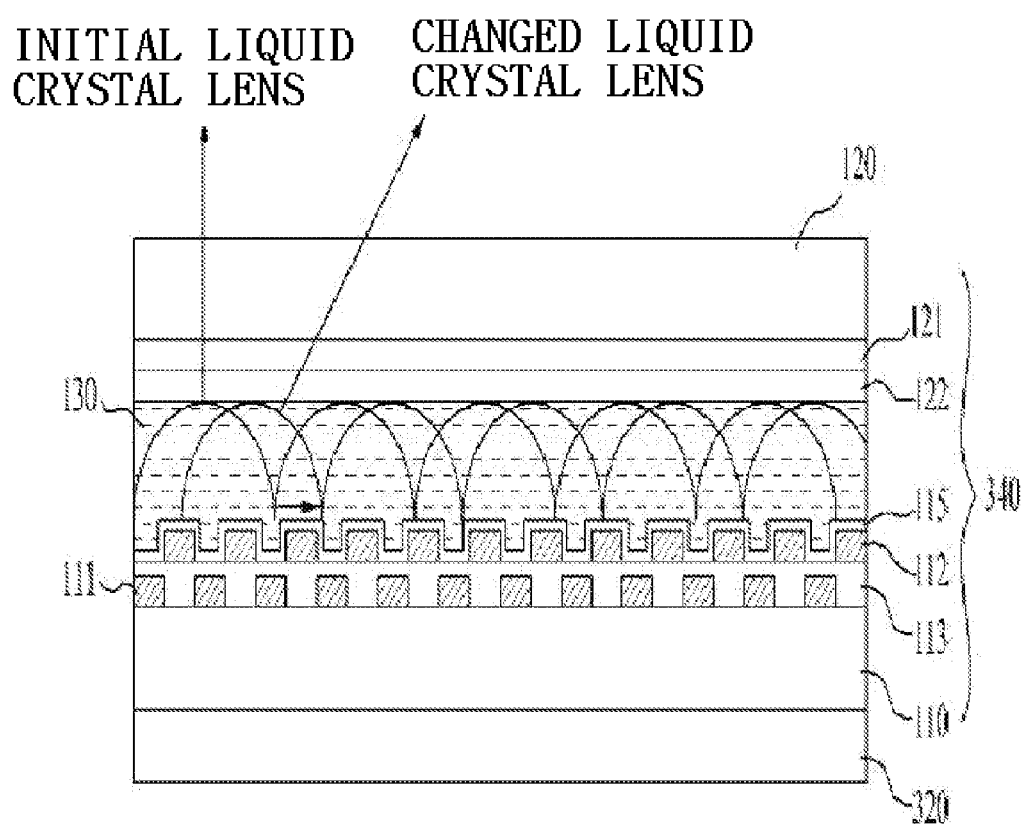
FIG. 9 is a cross-sectional view of a switchable panel, in which arrangement of liquid crystals has been changed, in accordance with the present invention.

FIG. 9 is a cross-sectional view of a switchable panel, in which arrangement of liquid crystals has been changed, in accordance with the present invention. Parts in FIG. 9, which have the same functions as the above-described parts, are denoted by the same reference numerals, and a detailed description thereof will be omitted.

With reference to FIG. 9, in the stereoscopic image display device, if no viewer from among multiple viewers changes position, liquid crystals of the liquid crystal layer 130 are arranged so as to have an initial liquid crystal lens effect. However, if one viewer from among the multiple viewers changes position, arrangement of the liquid crystals is changed so as to change the liquid crystal lens effect, and thus a region in which the viewer is finally located becomes an ortho-stereoscopic region.

The above-described stereoscopic image display device of the present invention enables (N−1)/M viewers to simultaneously observe a stereoscopic image without use of glasses if the number of views is N and an interval between the views is an interval between both eyes/M (M being the number of views disposed between both eyes of a viewer and being a natural number more than 1). Particularly, the stereoscopic image display device enables the multiple viewers to observe the stereoscopic image without use of glasses using a user tracking method even if one viewer from among the multiple viewers changes position.

The above-described stereoscopic image display device has effects, as follows.

First, even if multiple viewers are located at different positions, a viewer located on a line of continuous views may observe a stereoscopic image without use of glasses. Further, if the number of continuous views is N (N being a natural number more than 3), an interval between observing regions is an interval between both eyes of the viewer/M (M being a natural number more than 1), and, if distances between the display panel and the viewers are within a regular distance range, (N−1)/M viewers may simultaneously observe the stereoscopic image without use of glasses.

Second, when one viewer from the multiple viewers moves, the final position of the moving viewer is detected through tracking of the pupils or the face f of the moving viewer, and disparity between voltage signals applied to the electrodes of the switchable panel is adjusted so that the final position becomes an ortho-stereoscopic region, thereby enabling the viewer in the final position to observe the stereoscopic image without use of glasses.

It will be apparent to those skilled in the art that various modified embodiments and variations can be made in the present invention without departing from the spirit or scope of the inventions. Thus, it is intended that the present invention covers the modified embodiments and variations of this invention provided they come within the scope of the appended claims and their equivalents.

What is claimed is:

1. A stereoscopic image display device, comprising:
a display panel corresponding to one switchable region configured to emit two-dimensional images, the number of which is more than the number of N views (disparity), where N is a natural number over 3;
a switchable panel on the display panel configured to convert the two-dimensional images into three-dimensional images and to emit the three-dimensional images when voltage is applied thereto;
a detection unit configured to detect movement of moving viewers from among multiple views and final positions of the moving viewers; and
a control unit configured to output a control signal to shift the views of the two-dimensional images according to the movement and the final positions of the moving viewers,
wherein, when the detection unit detects a viewer located in an inverse-stereoscopic region corresponding to discontinuous views, the control unit is further configured to convert the discontinuous views into continuous views.

2. The stereoscopic image display device according to claim 1, wherein the switchable panel includes:
first and second substrates disposed opposite to each other;
a plurality of first electrodes formed on the first substrate corresponding to the one switchable region;
a second electrode formed on the second substrate; and
a voltage source configured to apply voltages to the plurality of first electrodes and the second electrode.

3. The stereoscopic image display device according to claim 2, wherein parabolic potential surfaces are formed in a liquid crystal layer of the switchable panel by applying the voltages to the first and second electrodes.

4. The stereoscopic image display device according to claim 2, wherein a liquid crystal layer of the switchable panel is divided into black regions and white regions by applying the voltages to the first and second electrodes.

5. The stereoscopic image display device according to claim 4, wherein the switchable panel further includes a polarizing plate formed on the second substrate.

6. The stereoscopic image display device according to claim 2, wherein the voltage source is further configured to apply voltages, which are increased from the center of the one switchable region to both sides thereof, to the plurality of first electrodes corresponding to the one switchable region.

7. The stereoscopic image display device according to claim 1, wherein the control unit is further configured to output a voltage control signal to shift the voltages applied to the plurality of first electrodes according to the movement and the final positions of the moving viewers.

8. The stereoscopic image display device according to claim 7, wherein the voltage control signal is further configured to shift the views of the two-dimensional images so that continuous views correspond to both eyes of the viewers which have moved.

9. The stereoscopic image display device according to claim 1, wherein the detection unit is further configured to detect the movement of the moving viewers through a difference between the pupils or a part of the faces of the moving viewers and a background color.

10. The stereoscopic image display device according to claim 1, wherein, if an interval between the views is an interval between both eyes of the viewers/M, (N−1)/M viewers simultaneously observe a stereoscopic image,
where M is a natural number over 2.

* * * * *